US010540398B2

United States Patent
Sevenich et al.

(10) Patent No.: US 10,540,398 B2
(45) Date of Patent: Jan. 21, 2020

(54) MULTI-SOURCE BREADTH-FIRST SEARCH (MS-BFS) TECHNIQUE AND GRAPH PROCESSING SYSTEM THAT APPLIES IT

(71) Applicant: Oracle International Corporation, Redwood Shores, CA (US)

(72) Inventors: Martin Sevenich, Palo Alto, CA (US); Sungpack Hong, Palo Alto, CA (US); Alexander Weld, Mountain View, CA (US); Hassan Chafi, San Mateo, CA (US); Daniel Lehmann, Frankfurt (DE)

(73) Assignee: Oracle International Corporation, Redwood Shores, CA (US)

( * ) Notice: Subject to any disclaimer, the term of this patent is extended or adjusted under 35 U.S.C. 154(b) by 458 days.

(21) Appl. No.: 15/495,193

(22) Filed: Apr. 24, 2017

(65) Prior Publication Data

US 2018/0307777 A1    Oct. 25, 2018

(51) Int. Cl.
  *G06F 16/00*   (2019.01)
  *G06F 16/901*   (2019.01)
  *G06F 16/23*   (2019.01)
  *G06F 16/903*   (2019.01)

(52) U.S. Cl.
  CPC .......... *G06F 16/9024* (2019.01); *G06F 16/23* (2019.01); *G06F 16/90335* (2019.01)

(58) Field of Classification Search
  CPC .......... G06F 16/13; G06F 16/23; G06F 16/35; G06F 16/43; G06F 16/73; G06F 16/285; G06F 16/355; G06F 16/2465; G06F 16/9024; G06F 16/90335
  See application file for complete search history.

(56) References Cited

U.S. PATENT DOCUMENTS 6,105,018 A * 8/2000 Demers ............... G06F 16/22
                                                707/999.003
6,151,595 A * 11/2000 Pirolli ................ G06F 16/9558
                                                707/999.003

(Continued)

OTHER PUBLICATIONS

Yanagisawa, "A Multi-Source Label-Correcting Algorithm for the All Pairs Shorest Paths Problem", dated 2010, IEEE, pp. 1-10.

(Continued)

*Primary Examiner* — Ashish Thomas
*Assistant Examiner* — Rezwanul Mahmood
(74) *Attorney, Agent, or Firm* — Hickman Palermo Becker Bingham LLP; Brian N. Miller

(57) ABSTRACT

Techniques herein minimize memory needed to store distances between vertices of a graph for use during a multi-source breadth-first search (MS-BFS). In an embodiment, during each iteration of a first sequence of iterations of a MS-BFS, a computer updates a first matrix that contains elements that use a first primitive integer type having a first width to record a distance from a source vertex of a graph to another vertex. The computer detects that a count of iterations of the first sequence of iterations exceeds a threshold. Responsively, the computer creates a second matrix that contains elements that use a second primitive integer type having a second width that is larger than the first width to record a distance from a source vertex of the graph to another vertex. During each iteration of a second sequence of iterations of the MS-BFS, the computer updates the second matrix.

20 Claims, 5 Drawing Sheets

(56) References Cited

U.S. PATENT DOCUMENTS

| | | |
|---|---|---|
| 6,369,819 B1* | 4/2002 | Pitkow .................. G06F 16/958 345/440 |
| 6,883,161 B1 | 4/2005 | Chovin et al. |
| 7,366,842 B1 | 4/2008 | Accoclla |
| 7,398,499 B2* | 7/2008 | Lai ..................... G06F 17/5081 716/111 |
| 7,478,375 B1 | 1/2009 | Kersters |
| 7,805,454 B2 | 9/2010 | Zhou |
| 8,019,785 B2 | 9/2011 | Moir et al. |
| 8,229,968 B2* | 7/2012 | Wang .................. G06F 12/0875 707/798 |
| 8,234,233 B2 | 7/2012 | Zhou |
| 8,910,134 B2 | 12/2014 | Hong et al. |
| 8,949,811 B2 | 2/2015 | Murthy |
| 9,092,481 B2 | 7/2015 | Digaha |
| 9,367,823 B1* | 6/2016 | Mihalik .............. G06F 16/9535 |
| 9,535,842 B2* | 1/2017 | Schwetman, Jr. |
| 10,191,998 B1* | 1/2019 | Burkhardt ............ G06F 13/364 |
| 10,311,085 B2* | 6/2019 | Rezaei ............... G06Q 30/0256 |
| 10,339,254 B2* | 7/2019 | Dai |
| 2003/0023388 A1* | 1/2003 | Wagner .................... G16B 5/00 702/20 |
| 2003/0041095 A1* | 2/2003 | Konda .................. H04L 67/2823 709/201 |
| 2004/0083448 A1* | 4/2004 | Schulz .................. G06Q 10/06 717/101 |
| 2004/0150640 A1* | 8/2004 | Park ........................ G06T 17/00 345/419 |
| 2004/0187089 A1* | 9/2004 | Schulz .................. G06Q 10/06 717/101 |
| 2004/0194074 A1 | 9/2004 | Shibayama |
| 2005/0060287 A1* | 3/2005 | Hellman .................. G06F 16/35 707/999.002 |
| 2005/0097108 A1* | 5/2005 | Wang .................. G06F 16/284 707/999.1 |
| 2005/0278451 A1 | 12/2005 | Yamashita |
| 2006/0195463 A1 | 8/2006 | Bogner |
| 2006/0235812 A1* | 10/2006 | Rifkin .................... G06N 20/00 706/14 |
| 2006/0271564 A1* | 11/2006 | Meng Muntz ......... G06Q 10/00 707/999.1 |
| 2007/0192350 A1* | 8/2007 | Gao .................... G06K 9/6224 707/999.102 |
| 2007/0198621 A1* | 8/2007 | Lumsdaine ............. G06F 17/16 708/200 |
| 2007/0214115 A1* | 9/2007 | Liu ....................... G06F 16/951 707/999.003 |
| 2008/0275862 A1* | 11/2008 | Liu ....................... G96F 16/355 707/999.05 |
| 2009/0016355 A1* | 1/2009 | Moyes .................... H04L 45/02 370/395.31 |
| 2009/0106207 A1* | 4/2009 | Solheim ............... G06F 21/6218 707/999.003 |
| 2010/0049431 A1* | 2/2010 | Zetune .................... G01C 21/20 701/532 |
| 2010/0158528 A1* | 6/2010 | Resende ............... H04L 45/122 398/79 |
| 2010/0306158 A1* | 12/2010 | Andersen ................ G06F 17/10 706/52 |
| 2011/0055511 A1 | 3/2011 | Mantor |
| 2011/0099541 A1 | 4/2011 | Blomstedt |
| 2011/0138369 A1 | 6/2011 | Chandra |
| 2011/0194761 A1* | 8/2011 | Wang .................. G06K 9/00677 382/165 |
| 2011/0276962 A1 | 11/2011 | Chambers |
| 2012/0027300 A1* | 2/2012 | Zhou ........................ G06T 7/11 382/173 |
| 2012/0173947 A1* | 7/2012 | Voicila ............... H03M 13/1134 714/752 |
| 2012/0259792 A1* | 10/2012 | Duan .................... G06Q 10/06 705/348 |
| 2013/0086354 A1 | 4/2013 | Satish et al. |
| 2013/0097136 A1 | 4/2013 | Goldberg |
| 2013/0139135 A1 | 5/2013 | Ditu |
| 2013/0197900 A1* | 8/2013 | Rotbart ............... G06F 17/2785 704/9 |
| 2013/0261965 A1* | 10/2013 | Delling ............... G01C 21/3446 701/527 |
| 2013/0332667 A1* | 12/2013 | Uchigaito ............ G11C 7/1072 711/105 |
| 2013/0339352 A1* | 12/2013 | Jin ....................... G06Q 10/047 707/736 |
| 2014/0019949 A1 | 1/2014 | Craymer |
| 2014/0122812 A1 | 5/2014 | Hakura |
| 2014/0189665 A1 | 7/2014 | Hong et al. |
| 2014/0244657 A1* | 8/2014 | Mizell .................. G06T 11/206 707/743 |
| 2014/0306964 A1 | 10/2014 | Reddish |
| 2014/0310619 A1 | 10/2014 | Fickenwirth |
| 2014/0351820 A1 | 11/2014 | Lee |
| 2015/0007154 A1 | 1/2015 | Bharadwaj |
| 2015/0040110 A1 | 2/2015 | Adl-Tabatabai |
| 2015/0095698 A1 | 4/2015 | Ema |
| 2015/0112986 A1* | 4/2015 | Jin ..................... G06F 16/9024 707/736 |
| 2015/0120623 A1* | 4/2015 | Morara .................... G06N 5/00 706/12 |
| 2015/0128151 A1 | 5/2015 | Rak |
| 2015/0178405 A1 | 6/2015 | Hong et al. |
| 2015/0269211 A1* | 9/2015 | da Silva ............... G06F 16/285 707/725 |
| 2015/0293994 A1* | 10/2015 | Kelly ...................... H04L 41/12 707/740 |
| 2015/0331683 A1 | 11/2015 | Sevenich et al. |
| 2015/0350324 A1 | 12/2015 | Hu et al. |
| 2015/0355891 A1 | 12/2015 | Angerer |
| 2015/0379054 A1* | 12/2015 | Kernert ................ G06F 17/16 707/625 |
| 2016/0019228 A1 | 1/2016 | Hong |
| 2016/0048607 A1 | 2/2016 | Raman |
| 2016/0062776 A1 | 3/2016 | Stanfill |
| 2016/0062894 A1* | 3/2016 | Schwetman, Jr. .. G06F 12/0862 711/137 |
| 2016/0117358 A1* | 4/2016 | Schmid .................. G06F 16/24 707/736 |
| 2016/0132831 A1* | 5/2016 | Sharma ............. G06Q 10/1053 705/321 |
| 2016/0224473 A1* | 8/2016 | Acar ...................... G06F 16/35 |
| 2016/0306896 A1* | 10/2016 | Paradies ........... G06F 16/90335 |
| 2016/0335322 A1* | 11/2016 | Then ................... G06F 16/9024 |
| 2016/0364220 A1 | 12/2016 | Arai |
| 2017/0024192 A1 | 1/2017 | Hong et al. |
| 2017/0060958 A1* | 3/2017 | Van Rest ............ G06F 16/9024 |
| 2017/0091342 A1* | 3/2017 | Sun .................... G06F 16/9024 |
| 2017/0147740 A1* | 5/2017 | Chang .................... G03F 1/70 |
| 2017/0154282 A1* | 6/2017 | Rossi .................... G06K 9/00 |
| 2017/0168779 A1* | 6/2017 | Sevenich ............... G06F 8/456 |
| 2017/0168990 A1* | 6/2017 | Kernert ................ G06F 17/16 |
| 2017/0169133 A1* | 6/2017 | Kim ................... G06F 16/2237 |
| 2017/0199960 A1* | 7/2017 | Ghose .................. G16B 30/00 |
| 2017/0302691 A1* | 10/2017 | Singh ................. H04L 63/1425 |
| 2017/0336971 A1* | 11/2017 | Horn .................. G06F 12/0897 |
| 2017/0339209 A1* | 11/2017 | Schmid ............... H04L 67/2804 |
| 2018/0089369 A1* | 3/2018 | Semenyuk ............. H03M 7/40 |
| 2018/0130019 A1* | 5/2018 | Kolb .................... G06N 20/00 |
| 2018/0158013 A1* | 6/2018 | Fu ...................... G01C 21/3446 |
| 2018/0189239 A1* | 7/2018 | Nurvitadhi ............ G06F 9/3001 |
| 2018/0203897 A1* | 7/2018 | Van Rest ............ G06F 16/9024 |
| 2018/0219888 A1* | 8/2018 | Apostolopoulos ......................... G06F 16/9024 |
| 2018/0232652 A1* | 8/2018 | Curtis .................. G06N 10/00 |
| 2018/0246986 A1* | 8/2018 | Haubenschild ...... G06F 16/9024 |
| 2018/0307777 A1* | 10/2018 | Sevenich ............ G06F 16/9024 |

OTHER PUBLICATIONS

Then, U.S. Appl. No. 14/710,117, filed May 12, 2018, Final Office Action, dated May 16, 2018.

Then U.S. Appl. No. 14/710,117, filed May 15, 2015, Office Action, dated Oct. 11, 2017.

(56) References Cited

OTHER PUBLICATIONS

Sevenich, U.S. Appl. No. 14/969,231, filed Dec. 15, 2015, Office Action, dated Sep. 8, 2017.
Then et al., "The More the Merrier: Efficient Mufti-Source Graph Traversal", Proceedings of the VLDB Endowment, vol. 8 Issue 4, Dec. 2014, 12 pages.
Sevenich et al., "Using Domain-Specific Languages for Analytic Grpah Database", VLDB Endowment, dated Sep. 2016, pp. 1257-1268.
Schiller et al., "Efficient Data Structures for Dynamic Graph Analysis", IEEE, dated Nov. 2015, pp. 497-504.
Perez et al., "Ringo: Interactive Graph Analytics on Big-Memory Machines", ACM, SIGMOD, dated May 2015, 6 pages.
Hong et al., "Simplifying Scalable Graph Processing with a Domain-Specific Language", ADM, CGO'14, pp. 208-218.
Hong et al., "Early Experiences in Using a Domain-Specific Language for Large-Scale Graph Analysis", ACM, Grades, dated 2013, pp. 1-6.
Hong et al. "Green-Marl: A DSL for Easy and Efficeient Graph Analysis", ASPLOS' dated Mar. 2012, 14 pages.
Banerjee et al., "Towards Logical Level Design of Big Data", dated Jul. 2015, 7 pages.
Bak et al, "A Reference Interpreter for the Graph Programming Language GP 2", Proc. Graphs as Models (GaM 2015), vol. 181, dated Apr. 2015, 17 pages.
Yuechao, et al., "Multi-GPU Graph Analytics", dated Apr. 19, 2015, 12 pages.
Madduri, Kamesh, "Scaling up graph algorithms on emerging multicore systems", Berkeley Lab, 22 pages.
Lopez, Karen, "Your Master Data Is a Graph: Are You Ready?", Oracle, dated Mar. 2015, 14 pages.
Hang et al., "iBFS: Concurrent Breadth-First Search on GPUs", SIGMOD, dated Jun. 26, 2016, ACM, 14 pages.
Ariful et al., "A Parallel Tree Grafting Algorithm for Maximum Cardinality Matching in Bipartite Graphs", dated May 25, 2015, 10 pages.
Sevenich, U.S. Appl. No. 14/969,231, filed Dec. 15, 2015, Notice of Allowance, dated Jan. 11, 2018.
Then, U.S. Appl. No. 14/710,117, filed May 12, 2018, Notice of Allowance, dated Aug. 23, 2018.
Then, U.S. Appl. No. 14/710,117, filed May 12, 2015, Interview Summary, dated Jul. 18, 2018.

* cited by examiner

MULTI-SOURCE BREADTH-FIRST SEARCH (MS-BFS) TECHNIQUE AND GRAPH PROCESSING SYSTEM THAT APPLIES IT

FIELD OF THE DISCLOSURE

This disclosure relates to graph traversal. Presented herein are techniques that minimize how much memory is needed to store measurements of logical distances between vertices of a graph for use during a multi-source breadth-first search (MS-BFS).

BACKGROUND

Graph analysis is a recently popularized way of analyzing data, which considers not only properties of entities but also relationships between them. Algorithms for graph analysis may be based on breadth-first search (BFS). BFS is a way of systematically traversing a graph from a start vertex, such that all vertices with a distance of a given number of vertex hops are visited before vertices with a greater distance. Such algorithms may need to run multiple BFSs from different start vertices in the graph in order to compute a final result. Examples of such algorithms include closeness centrality and betweenness centrality.

Some techniques for BFS-based algorithms may perform all necessary BFSs independently. Thus even if the independent BFSs are simultaneously performed, they do not leverage any shared computation between them. Consequently, many subgraph traversals are made redundantly, which may waste time and energy.

Another technique that does leverage shared computation of BFSs is referred to herein as a multi-source breadth-first search (MS-BFS). This technique enables fast computation of multiple BFSs by simultaneously performing several instances of BFS traversals in a way that is very efficient because intermediate results (common traversals of subgraphs) are shared amongst the BFS instances. Consequently, the MS-BFS technique provides tremendous performance benefits, such as acceleration.

MS-BFS may be decomposed into batches (units of work) of paths or vertices to maximize throughput. MS-BFS stores a traversal distance (path length) for each batch. That information is referred to herein as "frontier history," which facilitates identifying the parent and children of each vertex in a traversal.

Unfortunately the memory required to store frontier history can be very significant because graph instances from real-world datasets are often very large in size (i.e. millions of vertices interconnected by billions of edges). Furthermore, pre-allocation of uninitialized data structures for frontier history involves a tradeoff between time and space. Memory space for pre-allocated frontier history may be minimized only if the diameter of a graph is known, which may be automatically discovered based on an algorithm of cubic complexity based on graph size (vertex count). Thus, saving pre-allocated memory for frontier history may take immense (cubic) time to calculate how little memory will suffice.

Alternatively, pre-allocation time may be minimized by more or less ignoring graph size and instead pre-allocating excessive memory to accommodate a possible worst case of demand for memory. Although excessive memory allocation may save preparation time, it may also cost additional time during search execution. For example, excessive memory allocation may involve using excessively large datatypes that do not encode data compactly. Such encoding sparsity and excessive memory allocation may thrash virtual memory during search execution, which entails disk latency. Alternatively, an embodiment may pre-allocate a modest amount of memory that may work for small graphs but may be inadequate for many graphs, thereby posing a risk of catastrophic malfunction, perhaps prematurely aborting an intensive graph analysis, such as after some hours of execution.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
   2.1 Graph Traversal
   2.2 Concurrency
   2.3 Sequence of Iterations
   2.4 Frontier History
   2.5 Distance Matrix
   2.6 Value Encoding Into Primitive Integer Type
   2.7 Progressive Sequences and Types
   2.8 Serial Numbers
3.0 Frontier History Recording Process
   3.1 Integer Exhaustion Detection
   3.2 Repeated Exhaustions by Very Large Graph
   3.3 Dynamic Allocation
   3.4 Progressive Thresholds
4.0 Hardware Overview
5.0 Software Overview
6.0 Cloud Computing

1.0 General Overview

Techniques are provided to minimize how much memory is needed to store measurements of logical distances between vertices of a graph for use during a multi-source breadth-first search (MS-BFS). In an embodiment, during each iteration of a first sequence of iterations of a MS-BFS, a computer updates a first matrix that contains elements that use a first primitive integer type having a first width to record a distance from a source vertex of a graph to a vertex of the graph. The computer detects that a count of iterations of the first sequence of iterations exceeds a threshold. In response to the detecting, the computer creates a second matrix that contains elements that use a second primitive integer type having a second width that is larger than the first width to record a distance from a source vertex of the graph to another vertex. During each iteration of a second sequence of iterations of the MS-BFS, the computer updates the second matrix.

In embodiments, progressive thresholds facilitate deferral of behaviors such as allocation of matrices and selection of integer type width. That facilitates an encoding density for distances that is not achieved by conventional (pessimistic and eager) allocation of memory for matrices. By decreasing demand for memory, techniques herein may decrease virtual memory thrashing, thereby avoiding disk activity, thereby accelerating the computer.

In embodiments, encoding techniques enable a signed integer to store positive values that occupy a same range of values as an unsigned integer. Embodiments achieve concurrency with techniques such as symmetric multiprocessing (SMP), vertex batching, and work stealing. A growing series of distance matrices provides a complete frontier history for reference by threads and/or batches whose progress (current search radius) may differ.

2.0 Example Computer

Figure 1:
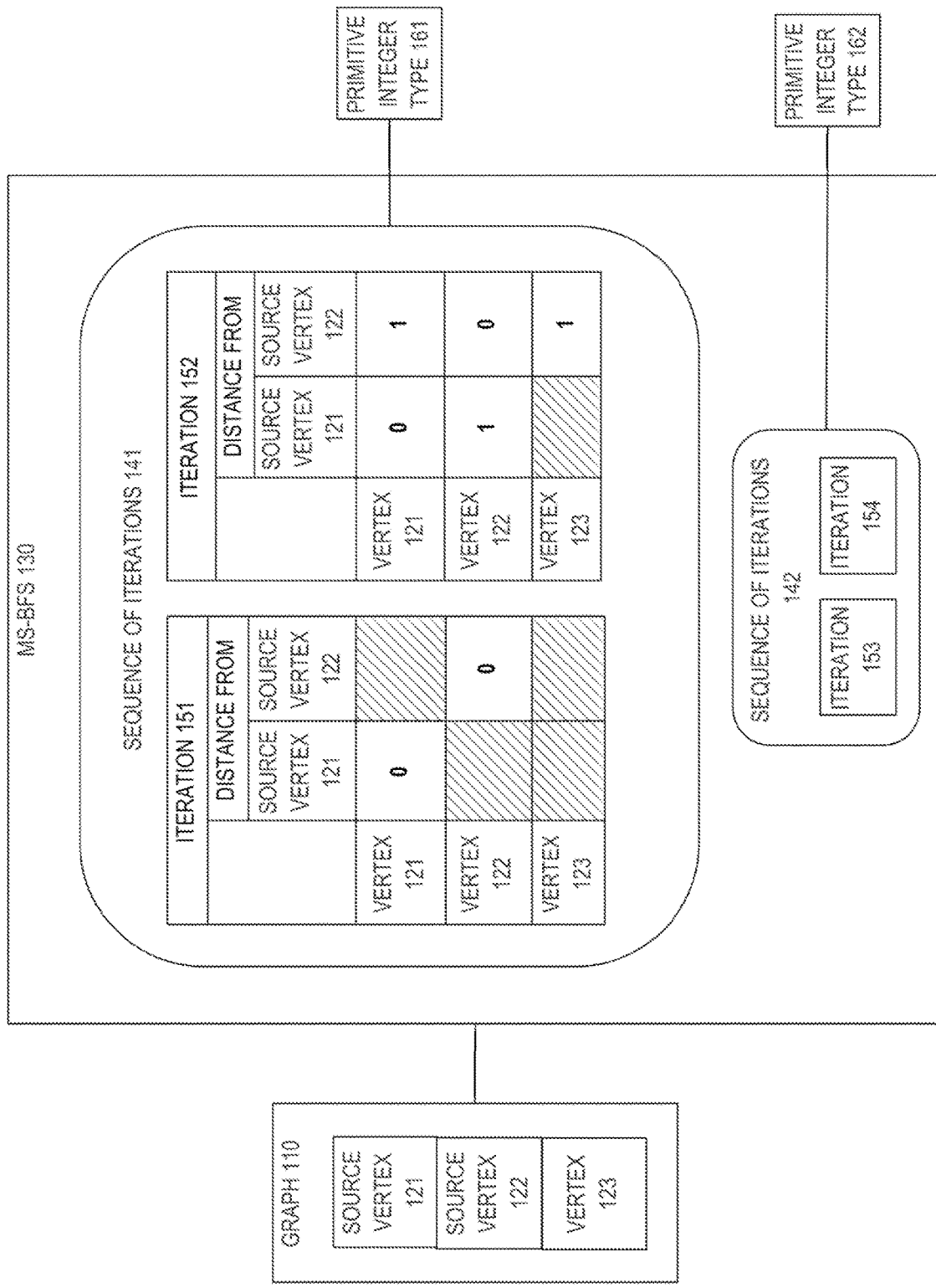
FIG. 1 is a block diagram that depicts an example computer that replaces a datatype of a frontier history of a multi-source breadth-first search (MS-BFS) based on an expanding search radius, in an embodiment.

FIG. 1 is a block diagram that depicts an example computer 100, in an embodiment. Computer 100 replaces a datatype of a frontier history of a multi-source breadth-first search (MS-BFS) based on an expanding search radius.

Computer 100 may be one or more rack servers such as blades, personal computers, mainframes, network appliances, virtual machines, smartphones, or other computing device. In embodiments, computer 100 accesses graph 110 that is stored in memory, on disk, or over a network.

2.1 Graph Traversal

Graph 110 is a logical graph comprised of interconnected vertices such as vertices 121-123. Graph 110 may have disconnected subgraphs such that some vertices may be unreachable (not directly or indirectly connected) to a given vertex.

In operation, computer 100 performs multi-source breadth-first search (MS-BFS) 130 to discover interesting traversal paths through graph 110 that originate from given source vertices. In this example, MS-BFS 130 originates from source vertices 121-122.

2.2 Concurrency

MS-BFS 130 is parallelizable by design. Indeed, MS-BFS 130 is well suited to shared-memory and task-parallel implementations, such as symmetric multiprocessing (SMP) and especially multicore. For example, computer 100 may simultaneously explore paths that originate from both source vertices 121-122.

For example, concurrency may be achieved with multiple execution threads such as lightweight threads or heavyweight user processes. In embodiments, a separate thread traverses paths that originate from a respective subset of source vertices.

One vertex may have multiple neighboring vertices. For example, source vertex 122 has vertices 121 and 123 as neighbors.

Thus, fan-out is natural to breadth-first search. Fan-out may generate an amount of traversal paths that exceeds the amount of source vertices and/or execution threads.

Thus, workflow management techniques such as work stealing and/or batching of neighbor vertices to visit (traverse). In SMP embodiments, threads may be pooled, may be associated with processors or processor cores such as at a one-to-one or other ratio, and may be created according to how many processors or processor cores are available.

Batching of traversals may increase memory locality, thereby decreasing demand for memory bandwidth. Furthermore, batching is amenable to vectorization such as single instruction multiple data (SIMD).

Furthermore, underlying mechanisms of MS-BFS 130 may maintain a set of vertices currently being visited and a set of previously visited vertices, for each thread or batch. Thus, the status (visiting or visited) of vertices may be tracked, and these binary statuses are readily implemented as sets of bits, which are naturally amenable to SIMD on any general-purpose register-based processor.

2.3 Sequence of Iterations

Breadth-first search is iterative. Thus, MS-BFS 130 executes a series of iterations, which may occur as subseries of iterations such as sequence of iterations 141 followed by 142.

For example, sequence of iterations 141 includes iterations 151-152. Likewise, sequence of iterations 142 includes iterations 153-154. Thus, computer 100 sequentially creates and performs iterations 151-154.

2.4 Frontier History

Each sequence of iterations 141-142 includes a matrix data structure that computer 100 creates in memory. For example when computer 100 begins sequence of iterations 141, computer 100 creates the matrix shown as iteration 151. When computer 100 performs iteration 151, computer 100 uses the matrix shown as iteration 151.

Subsequently, computer 100 performs iteration 152. However because iterations 151-152 are in a same sequence of iterations 141, computer 100 reuses the matrix of iteration 151 again for iteration 152. Thus, what is shown as separate matrices for iteration 151-152 is actually a same matrix being reused throughout sequence of iterations 141.

However as sequence of iterations 141 progresses through iterations 151-152, increasing amounts of actual numeric distance values are stored within the matrix. This dynamically growing progression of distance values provides a frontier history of (completely or partially) traversed paths.

In embodiments, each thread has its own copies of matrices of iterations 151-154. In some distributed embodiments, computer 100 may be a cluster of computers, each of which has its own copies of matrices of iterations 151-154 shared by threads hosted on that computer. In shared memory embodiments, there is only one copy of the matrices, which all threads share. As MS-BFS 130 runs, the growing series of distance matrices provides a complete frontier history for reference by threads and/or batches whose progress (current search radius) may differ.

2.5 Distance Matrix

The first iteration (151) visits source vertices 121-122, which are the origins of all traversal paths. Source vertices are reachable without actually traversing to other vertices.

Thus in iteration 151, the traversal paths have zero length. Thus, iteration 151 stores only zeros for distance values.

For example, source vertex 121 can be reached from itself with a path length of zero. Indeed, any source vertex can be reached from itself with a path length of zero.

Thus in this example, a distance value of zero is stored along the matrix diagonal of iteration 151. Because MS-BFS has two source vertices, iteration 151 stores two zeros along the matrix diagonal.

However in other examples, the initial zeroes need not align along a diagonal. For example if source vertices instead were vertices 121 and 123, then initial zeroes would not occur along a diagonal.

Likewise with a path length of zero, only each source vertex is reachable from itself. Thus, all other vertices are unreachable from a source vertex during iteration 151.

For example, vertices 122-123 are unreachable from source vertex 121 during iteration 151. Unreachable vertices are shown in the matrix of iteration 151 as shaded and without a value.

For example during iteration 151, source vertex 121 is reachable from itself but not from source vertex 122. Thus, the top matrix row of iteration 151 has a zero on the left and is shaded without a value on the right.

During iteration 151, vertex 123 is unreachable from both source vertices 121-122. Thus, the bottom matrix row of iteration 151 is entirely shaded and without values.

In a signed integer embodiment, a distance value of −1 may represent unreachability. Thus, the shaded matrix elements may each actually store −1. In unsigned embodiments, a different value indicates unreachability.

Each iteration adds more distance values to the distance values recorded in the previous iteration. Thus, computer 100 supplements the distance values of iteration 151 with additional values calculated during iteration 152.

Thus, iterations 151-152 both have zeros along the matrix diagonal. However because each successive iteration of a breadth-first search incrementally expands the search horizon (radius), some of the shaded valueless elements of the previous iteration may receive values in the next iteration.

For example, iteration 152 also records paths from source vertices with a distance of one. For example, vertex 123 is reachable from source vertex 122 at a distance of one.

Thus, a one is stored in the lower right element of iteration 152, even though the same element indicated unreachability in iteration 151. Thus with enough iterations, MS-BFS 130 may or may not eventually create an iteration that stores an actual distance value in every matrix element.

2.6 Value Encoding into Primitive Integer Type

Graph 110 may contain billions of vertices and trillions of edges, such as in an artificial neural network. Thus, the size (memory footprint) of an iteration matrix may be immense.

Matrix size may be minimized by encoding distance values in a primitive integer datatype that has no more bytes than needed to store the largest distance value of that iteration. For example, iteration 151 has distance values of zero and −1, which are two values. Two values may be minimally encoded as a single bit or byte.

All iterations of a given sequence of iterations, such as 141, use a same datatype for encoding distance values. For example, iterations 151-152 may both use a byte to store distance values.

Thus, sequence of iterations 141 has primitive integer type 161, which may be a byte. Whereas, sequence of iterations 142 may have a different datatype for distance values, such as primitive integer type 162, which may be something other than a byte.

A signed byte may directly store values ranging from −128 to 127. Thus, a signed byte cannot directly store a distance value for a path whose length exceeds 127. Thus, directly stored signed bytes cannot be used to fully traverse a graph whose diameter exceeds 127.

However, an embodiment may use an unsigned byte, which encodes values from 0 to 255. Value 255 may indicate unreachability, in the same way that −1 may for a signed integer.

Likewise, an embodiment may use a signed byte and subtract 127 from the distance value during encoding. For example, a distance of 1 may be encoded as −126. Likewise, a distance of 227 may be encoded as 100, which can be stored in a signed byte, even though a signed byte cannot directly store a value of 227.

2.7 Progressive Sequences and Types

Eventually, sequence of iterations 141 may have enough iterations to expand the search horizon (path length) beyond the capacity of a byte. Although sequence of iterations 141 shows only two iterations, sequence of iterations 141 may actually have 255 iterations before exhausting primitive integer type 161 as a byte.

Even though the iterations of MS-BFS 130 may still continue beyond the exhaustion of primitive integer type 161, sequence of iterations 141 will have no additional iterations. Additional iterations instead occur in sequence of iterations 142 with primitive integer type 162 that is bigger (has more bytes) than primitive integer type 161. Thus, sequence of iterations 142 accommodates search horizons that are too big for sequence of iterations 141.

In embodiments, when transitioning from sequence of iterations 141 to 142, computer 100 regenerates the iteration matrices (151-152) of sequence of iterations 141 using primitive integer type 162 instead of 161. Such regeneration may involve upcasting, such as a widening primitive conversion.

For example, byte values may be upcasted to short values. By upcasting the distance values of previous sequences of iterations, computer 100 may maintain all iteration matrices (151-154) with a same datatype, such as primitive integer type 162.

Eventually primitive integer type 162 may also be exhausted. Computer 100 may create a third sequence of iterations (not shown) with an even bigger distance datatype (not shown).

For example in Java, computer 100 may successively use a byte, a short, an int, and a long as primitive integer types to store distance values. A long can encode distances of a graph having a diameter bigger than any graph ever loaded into computer memory.

2.8 Serial Numbers

In embodiments, every iteration has a zero-based serial number. For example, iteration 151 may have a serial number of zero. Likewise, iteration 152 may have a serial number of one.

The same serial numbering continues across all iterations, regardless of which iteration belongs to which sequence of iterations. The zero-based serial number of an iteration exactly matches the search horizon distance of the iteration.

For example, iteration 151 has a serial number of zero and search horizon of zero. Thus, recording a new distance value into a matrix element of an iteration may entail recording the serial number of the iteration.

3.0 Frontier History Recording Process

Figure 2:
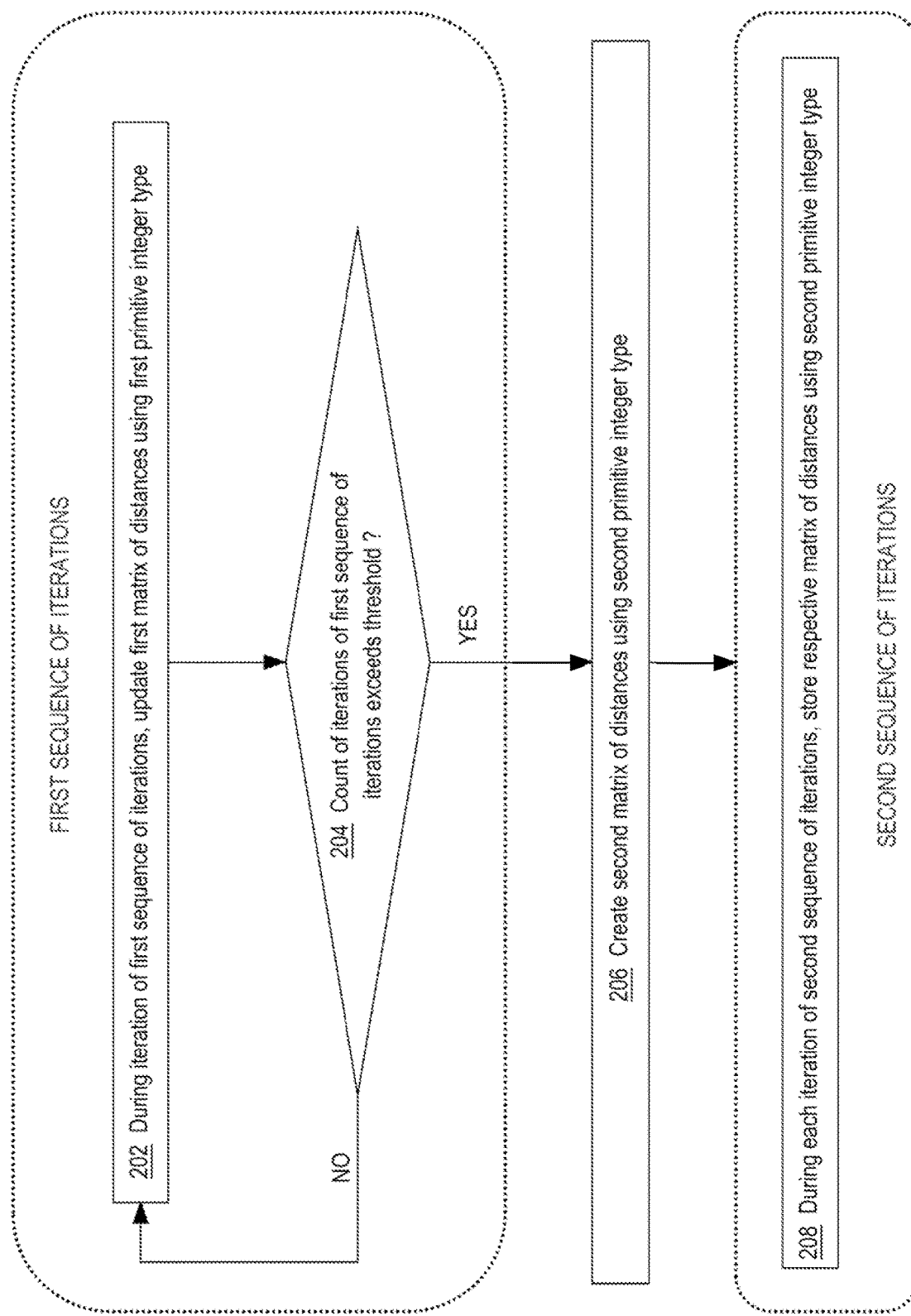
FIG. 2 is a flow diagram that depicts an example process that replaces a datatype of a frontier history of a MS-BFS based on an expanding search radius, in an embodiment.

FIG. 2 is a flow diagram that depicts an example process that replaces a datatype of a frontier history of a multi-source breadth-first search (MS-BFS) based on an expanding search radius. FIG. 2 is discussed with reference to FIG. 1.

Although not shown, before step 202, computer 100 creates a distance matrix for sequence of iterations 141 using a first primitive integer type. Steps 202 and 204 are performed for each iteration of sequence of iterations 141. For example, computer 100 performs steps 202 and 204 for iteration 151, and subsequently performs steps 202 and 204 again for iteration 152.

Step 202 populates a distance matrix of a current sequence of iterations using a first primitive integer type. For example, computer 100 populates the matrix for iteration 151 in memory using primitive integer type 161 to encode distance values.

3.1 Integer Exhaustion Detection

Step 204 detects whether or not the first sequence of iterations has enough iterations to exceed a threshold. The threshold is based on the maximum distance value that primitive integer type 161 can encode.

For example if primitive integer type 161 is a byte, then the threshold is 254. Thus in step 204, computer 100 detects whether sequence of iterations 141 has grown to include 255 (exceeds 254) iterations.

If step 204 detects that the threshold is not yet exceeded, then computer 100 repeats steps 202 and 204 for another iteration. Thus, the number of iterations in sequence of iterations 141 grows incrementally (until the threshold is exceeded).

If step 204 detects that the threshold is exceeded, then computer 100 has finished sequence of iterations 141 and begins sequence of iterations 142 by proceeding to step 206. In step 206 a second distance matrix using a second primitive integer type is created for a next sequence of iterations. Computer 100 may copy (and upcast) values from the first distance matrix into the second distance matrix.

Step 208 performs all of the iterations of sequence of iterations 142. For each iteration during step 208, the second distance matrix populated using the second primitive integer type to encode distances. For example, computer 100 successively populates the second distance matrix during iterations 153-154 using primitive integer type 162.

3.2 Repeated Exhaustions by Very Large Graph

FIGS. 1-2 show that MS-BFS 130 has two sequence of iterations (141-142). For example, sequence of iteration 142 uses primitive integer type 162 that may be a short that can encode distance values for a graph having a diameter of at most 64,000 approximately.

Figure 3:
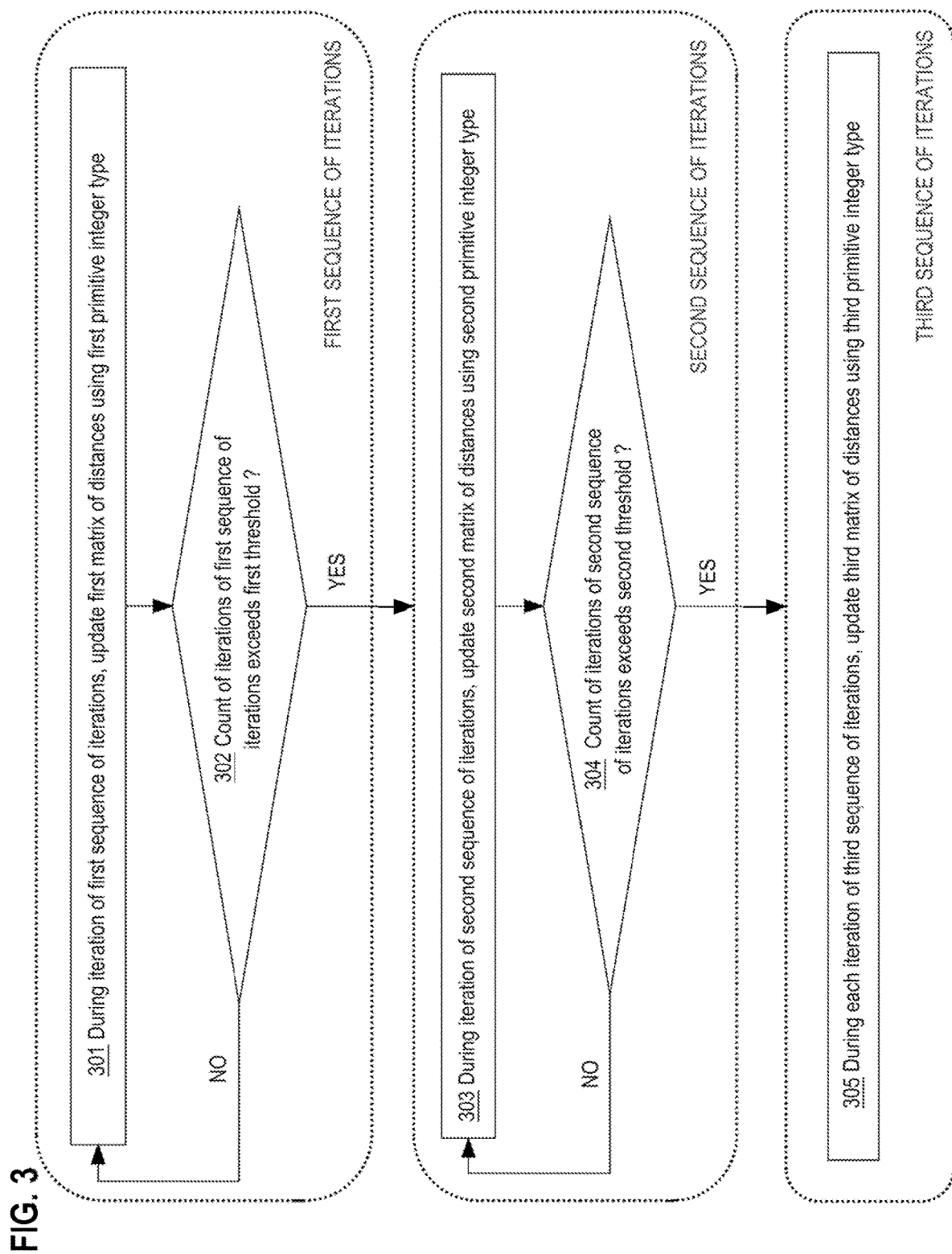
FIG. 3 is a flow diagram that depicts an example process that replaces a datatype of a frontier history based on progressively larger primitive integer types, in an embodiment.

However if the graph diameter exceeds approximately 64,000, then a third sequence of iterations (not shown) with a third primitive integer type (not shown) would be necessary. FIG. 3 shows the same process as FIG. 2, but with an additional (third) sequence of iterations to accommodate a larger graph.

In the same way, additional sequence of iterations can be accommodated by expanding the process flow with similar additional steps. Thus, FIG. 3 appears to expand upon FIG. 2.

Such expansion may be repeated arbitrarily to create a longer process flow that accommodates more sequences of iterations for bigger search horizons. Such expansion is limited only by available primitive integer types of various widths.

For example, Java provides primitive integer types having widths of 1, 2, 4, and 8 bytes. Thus, the width doubles for each successively larger primitive integer type. Thus, the encoding range of distance values grows geometrically.

3.3 Dynamic Allocation

How many sequences of iterations are needed to fulfill MS-BFS 130 depends on how big is the diameter of graph 110. However, computer 100 need not calculate the diameter of graph 110 before or during MS-BFS 130, thereby avoiding a calculation whose complexity is a cubic (very expensive) function of graph size (vertex count).

Instead, computer 100 dynamically creates additional sequences of iterations on demand (just in time). When a current primitive integer type is exhausted, computer 100 dynamically switches to the next bigger primitive integer type, creates another distance matrix using that next integer type, and begins a next sequence of iterations. In this way, the selection of integer type width is deferred (not finalized when MS-BFS 130 starts).

3.4 Progressive Thresholds

An aspect of FIG. 3 that does not appear in FIG. 2 is that steps 302 and 304 use different thresholds. Step 304 uses a threshold that is bigger than the threshold of step 302. That is because sequence of iterations 142 uses primitive integer type 162 that encodes a range of distance values that is bigger than the value range for primitive integer type 161 of sequence of iterations 141. Although not shown, immediately before each sequence of iterations, computer 100 creates another distance matrix using a next integer type.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
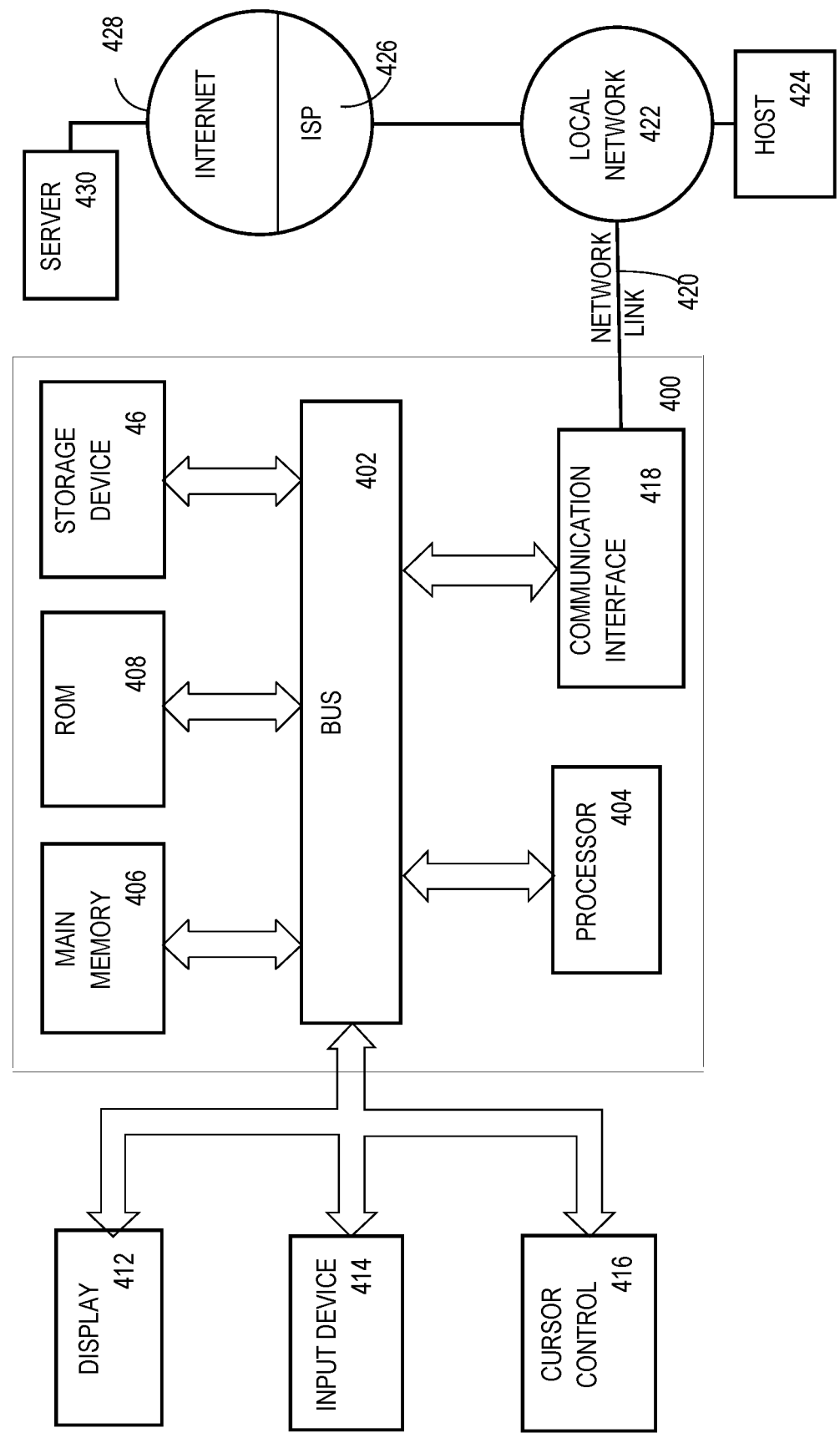
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 46, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 46. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 46. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 46 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 46, or other non-volatile storage for later execution.

5.0 Software Overview

Figure 5:
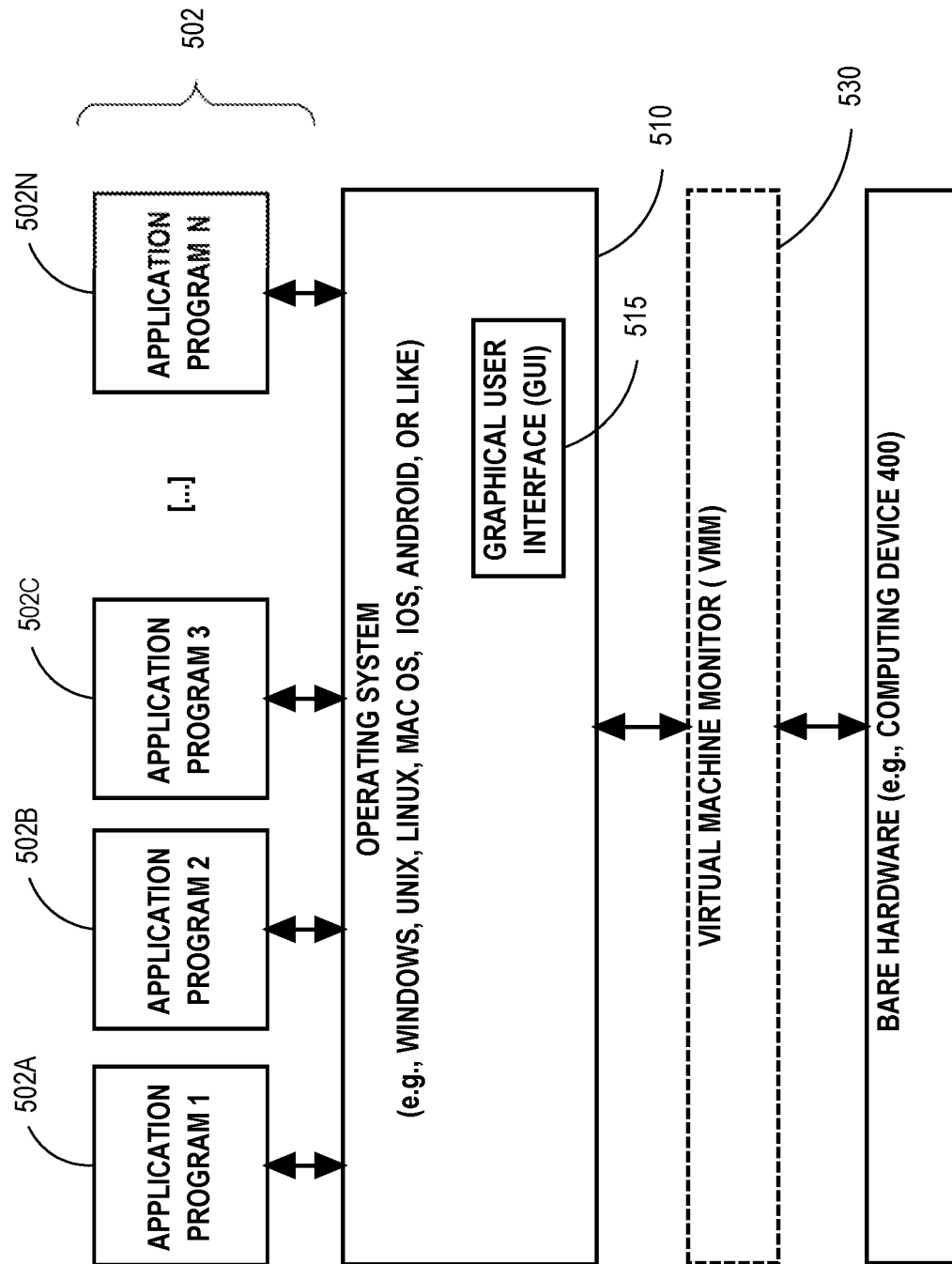
FIG. 5 is a block diagram that illustrates a basic software system 500 that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 106 and on fixed storage (e.g., hard disk or flash memory) 110, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 110 into memory 106) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 104) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

6.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    during each iteration of a first sequence of iterations of a multi-source breadth first search (MS-BFS), updating a first matrix that contains a plurality of elements that use a first primitive integer type having a first width to record a distance from a source vertex of a graph to a vertex of the graph;

detecting that a count of iterations of the first sequence of iterations exceeds a threshold;

creating, in response to the detecting, a second matrix that contains a plurality of elements that use a second primitive integer type having a second width that is larger than the first width to record a distance from a source vertex of the graph to a vertex of the graph;

during each iteration of a second sequence of iterations of the MS-BFS, updating the second matrix.

2. The method of claim 1 wherein the second width is twice the first width.

3. The method of claim 1 wherein after the detecting further comprises replacing the first matrix by upcasting values of the first matrix.

4. The method of claim 1 wherein the first primitive integer type having the first width to record the distance comprises a signed integer type that records an arithmetic difference of the distance minus a maximum positive value of the signed integer type.

5. The method of claim 1 wherein the MS-BFS comprises at least two threads that share a same copy of the first matrix.

6. The method of claim 1 wherein the first width is one byte.

7. The method of claim 1 wherein record a distance comprises record an identifier of the iteration.

8. One or more non-transitory computer-readable media storing instructions that, when executed by one or more processors, cause:

during each iteration of a first sequence of iterations of a multi-source breadth first search (MS-BFS), updating a first matrix that contains a plurality of elements that use a first primitive integer type having a first width to record a distance from a source vertex of a graph to a vertex of the graph;

detecting that a count of iterations of the first sequence of iterations exceeds a threshold;

creating, in response to the detecting, a second matrix that contains a plurality of elements that use a second primitive integer type having a second width that is larger than the first width to record a distance from a source vertex of the graph to a vertex of the graph;

during each iteration of a second sequence of iterations of the MS-BFS, updating the second matrix.

9. The one or more non-transitory computer-readable media of claim 8 wherein the second width is twice the first width.

10. The one or more non-transitory computer-readable media of claim 8 wherein after the detecting further comprises replacing the first matrix by upcasting values of the first matrix.

11. The one or more non-transitory computer-readable media of claim 8 wherein the first primitive integer type having the first width to record the distance comprises a signed integer type that records an arithmetic difference of the distance minus a maximum positive value of the signed integer type.

12. The one or more non-transitory computer-readable media of claim 8 wherein the MS-BFS comprises at least two threads that share a same copy of the first matrix.

13. The one or more non-transitory computer-readable media of claim 8 wherein the first width is one byte.

14. The one or more non-transitory computer-readable media of claim 8 wherein record a distance comprises record an identifier of the iteration.

15. A device comprising:
a memory configured to store a graph;
at least one processor connected to the memory and configured to:
during each iteration of a first sequence of iterations of a multi-source breadth first search (MS-BFS), updating a first matrix that contains a plurality of elements that use a first primitive integer type having a first width to record a distance from a source vertex of the graph to a vertex of the graph;

detecting that a count of iterations of the first sequence of iterations exceeds a threshold;

creating, in response to the detecting, a second matrix that contains a plurality of elements that use a second primitive integer type having a second width that is larger than the first width to record a distance from a source vertex of the graph to a vertex of the graph;

during each iteration of a second sequence of iterations of the MS-BFS, updating the second matrix.

16. The device of claim 15 wherein after the detecting further comprises replacing the first matrix by upcasting values of the first matrix.

17. The device of claim 15 wherein the first primitive integer type having the first width to record the distance comprises a signed integer type that records an arithmetic difference of the distance minus a maximum positive value of the signed integer type.

18. The device of claim 15 wherein the first width is one byte.

19. The device of claim 15 wherein the MS-BFS comprises at least two threads that share a same copy of the first matrix.

20. The device of claim 15 wherein the second width is twice the first width.

* * * * *